United States Patent
Mack et al.

(10) Patent No.: US 7,104,220 B1
(45) Date of Patent: Sep. 12, 2006

(54) OVERHEAD LIVESTOCK ENCLOSURE WASHING SYSTEM

(76) Inventors: Jerome Mack, 10858 365th Ave., Leola, SD (US) 57456; Troy Truebenbach, 10858 365th Ave., Leola, SD (US) 57456; Richard Kolb, 10858 365th Ave., Leola, SD (US) 57456

( * ) Notice: Subject to any disclaimer, the term of this patent is extended or adjusted under 35 U.S.C. 154(b) by 235 days.

(21) Appl. No.: 10/862,001

(22) Filed: Jun. 4, 2004

(51) Int. Cl.
*A01K 1/01* (2006.01)
*B05B 3/18* (2006.01)

(52) U.S. Cl. .................. 119/436; 119/442; 119/447; 239/743

(58) Field of Classification Search ............. 119/436, 119/437, 442, 447; 239/587.5, 722, 750, 239/751, 587.2, 587.1, 173, 739, 743, 148, 239/149
See application file for complete search history.

(56) References Cited

U.S. PATENT DOCUMENTS

| | | | | |
|---|---|---|---|---|
| 2,903,189 | A | * | 9/1959 | Patton .................. 239/129 |
| 3,715,774 | A | * | 2/1973 | Fannon, Jr. .............. 15/302 |
| 4,074,856 | A | * | 2/1978 | Williams et al. ............ 239/1 |
| 4,304,194 | A | * | 12/1981 | Boykin et al. .......... 119/51.04 |
| 4,313,397 | A | * | 2/1982 | Markum ................ 119/703 |
| 4,380,842 | A | * | 4/1983 | Thomas .................. 15/304 |
| 4,805,648 | A | * | 2/1989 | Hour .................. 134/57 R |
| 4,911,188 | A | * | 3/1990 | Seidel ................ 134/56 R |
| 4,981,268 | A | * | 1/1991 | Hour .................. 239/752 |
| RE33,746 | E | * | 11/1991 | Lucas .................. 239/744 |
| 5,326,037 | A | * | 7/1994 | Hour .................. 239/743 |
| 5,397,056 | A | * | 3/1995 | Sakatani et al. .......... 239/173 |
| 5,594,973 | A | * | 1/1997 | Brusseleers et al. .......... 15/304 |
| 5,613,511 | A | | 3/1997 | Andersen et al. |
| 5,740,821 | A | * | 4/1998 | Arnold .................. 134/113 |
| 5,947,387 | A | | 9/1999 | Zink et al. |
| 6,085,994 | A | | 7/2000 | Zink |
| 6,276,377 | B1 | * | 8/2001 | Hormann ................ 134/95.3 |
| 6,325,863 | B1 | | 12/2001 | Zamensky et al. |
| 6,372,053 | B1 | | 4/2002 | Belanger et al. |
| 6,394,370 | B1 | | 5/2002 | Payne et al. |
| 6,565,668 | B1 | | 5/2003 | Sandberg et al. |
| 6,591,780 | B1 | * | 7/2003 | Fujii .................... 119/57.4 |
| 6,789,755 | B1 | * | 9/2004 | Mack et al. ............ 239/587.5 |
| 6,810,832 | B1 | * | 11/2004 | Ford .................... 119/437 |
| 6,938,577 | B1 | * | 9/2005 | Kraft et al. ............. 119/57.1 |
| 2002/0162576 | A1 | | 11/2002 | Fratello et al. |
| 2004/0144873 | A1 | * | 7/2004 | Johnston ................ 239/751 |

* cited by examiner

*Primary Examiner*—Yvonne R. Abbott
(74) *Attorney, Agent, or Firm*—Jeffrey A. Proehl; Woods Fuller Shultz & Smith PC

(57) ABSTRACT

An overhead livestock enclosure washing system for cleaning the pens of a livestock confinement building. The overhead livestock enclosure washing system includes a track member coupled to the ceiling of the building. A mobile unit operationally engages the track member and selectively advances along the track member. The mobile unit is for being in fluid communication with a fluid source to spray fluid into the interior space of the livestock confinement building to clean the interior space of the building when the mobile unit advances along the track member. A base unit is positioned on the floor of the livestock confinement building. The base unit is in fluid communication with the mobile unit whereby the base unit controls the flow of the fluid from the fluid source to provide the mobile unit with pressurized fluid when the mobile unit is cleaning the interior space of the building.

20 Claims, 5 Drawing Sheets

OVERHEAD LIVESTOCK ENCLOSURE WASHING SYSTEM

BACKGROUND OF THE INVENTION

1. Field of the Invention

The present invention relates to animal stall cleaning devices and more particularly pertains to a new overhead livestock enclosure washing system for cleaning the pens of a livestock confinement building.

2. Description of the Prior Art

The use of animal stall cleaning devices is known in the prior art. More specifically, animal stall cleaning devices heretofore devised and utilized are known to consist basically of familiar, expected and obvious structural configurations, notwithstanding the myriad of designs encompassed by the crowded prior art which have been developed for the fulfillment of countless objectives and requirements.

Illustrative of the animal stall cleaning devices is U.S. Pat. No. 6,565,668 to Sandberg which provides a device that directs itself along the sides of the stalls and cleans the stalls as the device advances along the stalls. U.S. Pat. No. 5,947,387 to Zink provides a water jet tool that can be inserted into a hollow object with jet nozzles for directing the water in jet streams to clean the object with the jet nozzles create torque to actuate cross body rotation and allow the jet nozzles to continually changed direction and provide three dimensional cleaning. U.S. Pat. No. 6,085,994 to Zink provides a multiple nozzle swivel assembly that is mounted to a cable and travels along the cable to clean an area along the path of the cable. U.S. Pat. No. 5,613,511 to Andersen provides a carriage with a distribution valve mounted thereon and nozzles in fluid communication with the distribution valve so that the distribution valve distributes the cleaning fluid to the nozzles to clean the interior of a building as the carriage is drawn from one end of the building to the other. U.S. Pat. No. 6,325,863 to Zamensky provides a movable washing member on a continuous track that is moved along fixed rails to clean vehicles of varying lengths. U.S. Pat. No. 6,394,370 to Payne provides a plurality of reciprocating wands that are rotated in horizontal manner to clean the surfaces of a vehicle. U.S. Pat. No. 6,372,053 provides a spray arm mounted to a carriage that is longitudinal displaceable with the spray arm having vertical and horizontal nozzles that spray the vehicle when the spray arm is rotated around the vehicle.

In these respects, the overhead livestock enclosure washing system according to the present invention substantially departs from the conventional concepts and designs of the prior art, and in so doing provides an apparatus primarily developed for the purpose of cleaning the pens of a livestock confinement building.

SUMMARY OF THE INVENTION

In view of the foregoing disadvantages inherent in the known types of animal stall cleaning devices now present in the prior art, the present invention provides a new overhead livestock enclosure washing system construction wherein the same can be utilized for cleaning the pens of a livestock confinement building.

To attain this, the present invention generally comprises a track member for being coupled to the ceiling of the livestock confinement building. A mobile unit operationally engages the track member whereby the mobile unit selectively advances along the track member. The mobile unit is for being in fluid communication with a fluid source to spray fluid into the interior space of the livestock confinement building to clean the interior space of the livestock confinement building when the mobile unit advances along the track member. A base unit is for being positioned on the floor of the livestock confinement building. The base unit is in fluid communication with the mobile unit whereby the base unit is for controlling the flow of the fluid from the fluid source to provide the mobile unit with pressurized fluid when the mobile unit is cleaning the interior space of the livestock confinement building.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

One significant advantage of the present invention is that the system self-propels the mobile unit along the track member without the need of the user to monitor and the angle of the nozzle member provides the access through barriers having opening extending through the barriers to provide a more thorough cleaning of the pens.

Further advantages of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects of the invention will become apparent when consideration is given to the following detailed description thereof. Such description makes reference to the annexed drawings wherein.

DESCRIPTION OF PREFERRED EMBODIMENTS

With reference now to the drawings, and in particular to FIGS. 1 through 5 thereof, a new overhead livestock enclosure washing system embodying the principles and concepts of the present invention and generally designated by the reference numeral 10 will be described.

As best illustrated in FIGS. 1 through 5, the overhead livestock enclosure washing system 10 generally comprises a track member 12 for being coupled to the ceiling of the livestock confinement building or a trailer.

Figure 1:
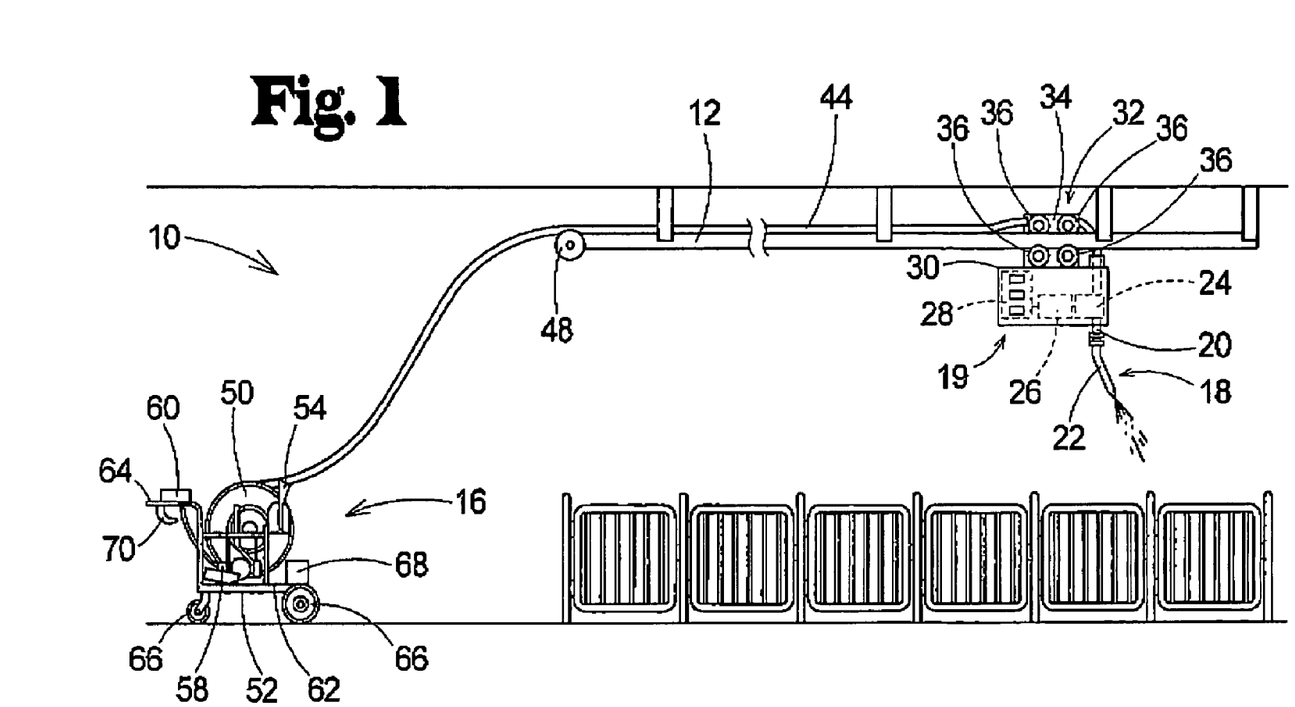
FIG. 1 is a side view of a new overhead livestock enclosure washing system according to the present invention shown in a livestock confinement building.
Figure 3:
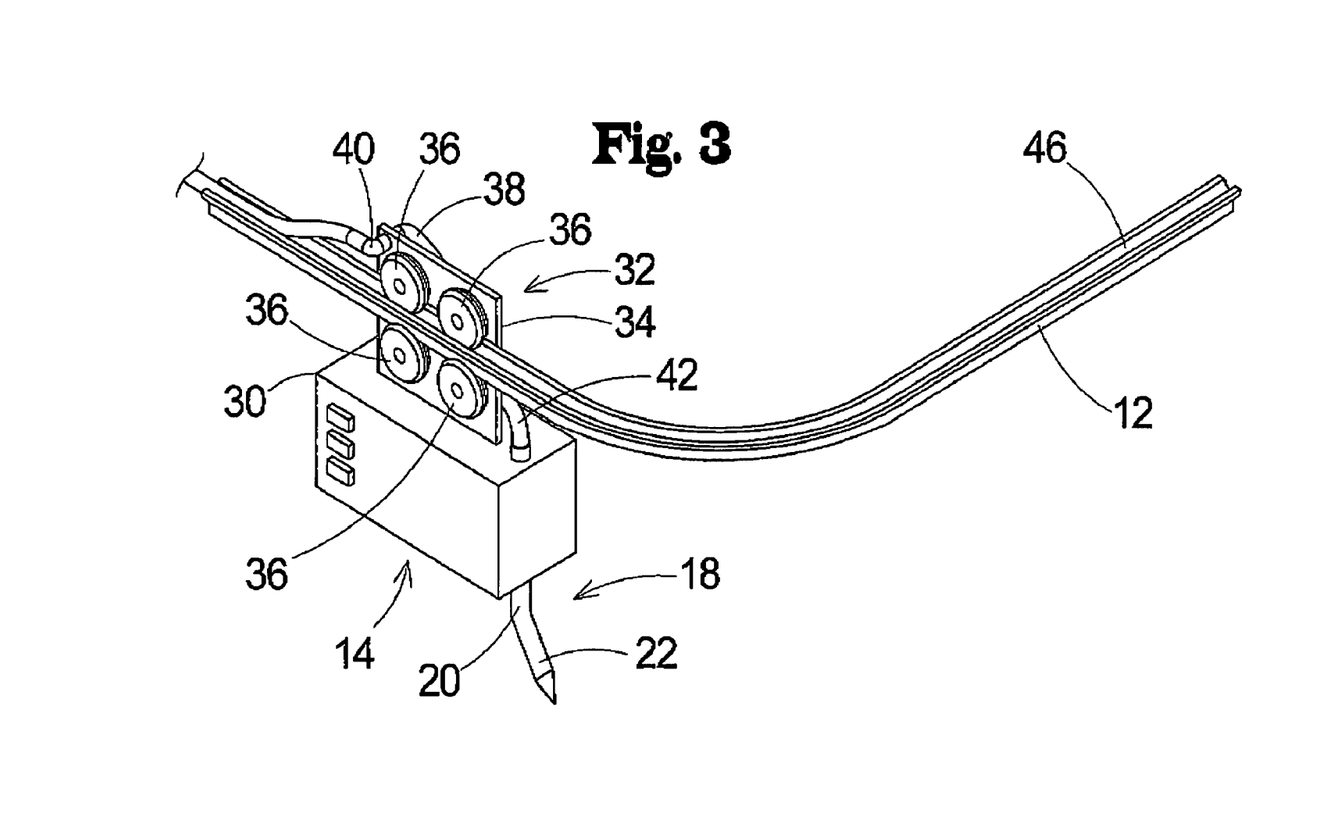
FIG. 3 is a perspective view of the mobile unit of the present invention shown operationally engaged to the track member.
Figure 4:
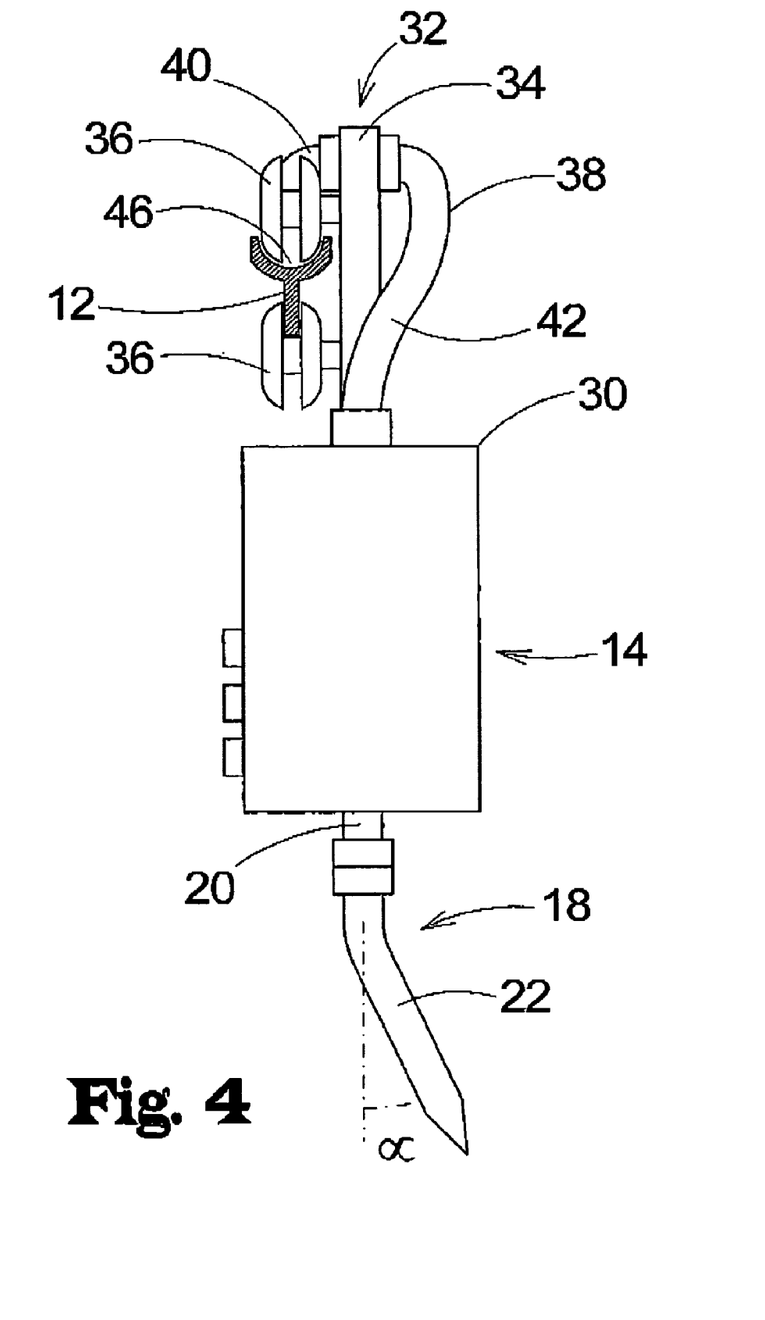
FIG. 4 is a side view of the mobile of the present invention operationally engaged to the track member.

A mobile unit 14 operationally engages the track member 12 whereby the mobile unit 14 selectively advances along the track member 12. The mobile unit 14 is for being in fluid communication with a fluid source to spray fluid into the interior space of the livestock confinement building to clean the interior space of the livestock confinement building when the mobile unit 14 advances along the track member 12.

Figure 2:
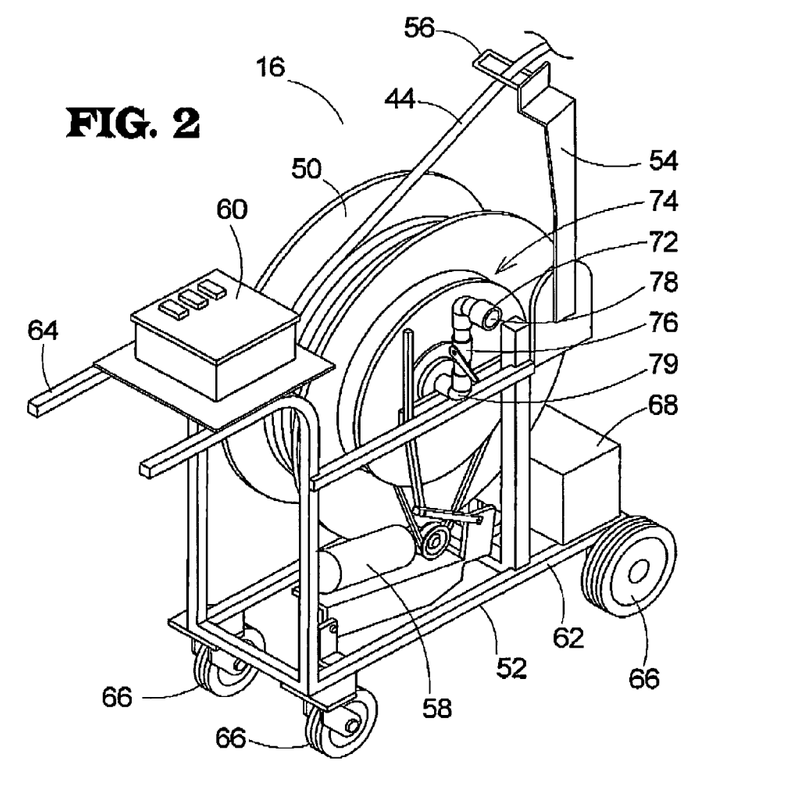
FIG. 2 is a perspective view of the base unit of the present invention.

A base unit 16 is for being positioned on the floor of the livestock confinement building. The base unit 16 is in fluid communication with the mobile unit 14 whereby the base unit 16 is for controlling the flow of the fluid from the fluid source to provide the mobile unit 14 with pressurized fluid when the mobile unit 14 is cleaning the interior space of the livestock confinement building.

A nozzle assembly 18 is operationally coupled to the mobile unit 14 whereby the nozzle assembly 18 is in fluid communication with the mobile unit 14. The nozzle assembly 18 is for spraying the fluid from the mobile unit 14 into the interior space of the livestock confinement building. The mobile unit 14 rotates the nozzle assembly 18 with respect to the mobile unit 14 to direct the fluid around the interior space of the livestock confinement building.

The nozzle assembly 18 comprises an inlet member 20 and a nozzle member 22. The inlet member 20 is operationally coupled to the mobile unit 14 whereby the inlet member 20 is rotated by the mobile unit 14. The nozzle assembly 18 is coupled to the inlet member 20 whereby the nozzle member 22 is positioned opposite the mobile unit 14. The inlet member 20 is in fluid communication between the nozzle member 22 and the mobile unit 14 whereby the nozzle member 22 is for spraying the fluid from the mobile unit 14 to clean the interior space of the livestock confinement building.

The nozzle member 22 is positioned at an oblique angle to the inlet member 20. The nozzle member 22 is rotated around a vertical axis of the inlet member 20 when the inlet member 20 is rotated by the mobile unit 14 to allow the fluid to be sprayed at an angle to the mobile unit 14 to access openings in a portion of the dividers to clean the interior space of the livestock confinement building. The oblique angle of the nozzle member 22 measures between approximately 10 degrees and approximately 60 degrees from the vertical, designated as a in FIG. 4.

The mobile unit 14 comprises a drive motor 24. The drive motor 24 is operationally coupled to the nozzle assembly 18 to rotate the nozzle assembly 18 with respect to the mobile unit 14.

The mobile unit 14 comprises a rechargeable power supply 26 being operationally coupled to the drive motor 24. The rechargeable power supply 26 supplies power to the drive motor 24 when the drive motor 24 is rotating the nozzle assembly 18. The power supply is for selectively engaging a power source to recharge the rechargeable power supply 26 when the mobile unit 14 is not being used to clean the interior space of the livestock confinement building.

The mobile unit 14 comprises a mobile control means 28 for controlling the drive motor 24. The mobile control means 28 actuates the drive motor 24 to control the direction and speed of rotation of the nozzle assembly 18 by the drive motor 24 when the mobile control means 28 is actuated by a user.

The mobile unit 14 comprises a housing 30. The drive motor 24 and the rechargeable power supply 26 are positioned in the housing 30 whereby the housing 30 inhibits the drive motor 24 and the rechargeable power supply 26 from inadvertently coming into contact with the fluid being sprayed by the nozzle assembly 18 extending downwardly from the housing 30.

A carriage assembly 32 is coupled to the housing 30 of the mobile unit 14. The carriage assembly 32 operationally engages the track member 12 whereby the carriage assembly 32 advances along the track member 12 to facilitate advancing the mobile unit 14 along the track member 12.

The carriage assembly 32 comprises a base plate 34 and a plurality of rollers 36. Each of the rollers 36 is rotatably coupled to the base plate 34. The base plate 34 is coupled to the mobile unit 14. Each the rollers 36 engages the track member 12 whereby each of the rollers 36 rolls along the track member 12 to advance the mobile unit 14 along the track member 12 when the carriage assembly 32 is advancing along the track member 12.

The rollers 36 of the carriage assembly 32 comprise at lest one of the rollers 36 being positioned above the track member 12 and at least one of the rollers 36 being positioned below the track member 12 to inhibit the carriage assembly 32 becoming inadvertently disengaged from the track member 12 when the carriage assembly 32 is advancing along the track member 12.

The mobile unit 14 comprises an intake member 38 being coupled to the base plate 34 of the carriage assembly 32 to limit the amount of stress on the intake member 38 when the mobile unit 14 is advanced along the track member 12. The intake member 38 is in fluid communication with the base unit 16 to supply the fluid to the mobile unit 14 when the mobile unit 14 is cleaning the interior space of the livestock confinement building.

The intake member 38 comprises a coupling portion 40 and a transfer portion 42. The coupling portion 40 is coupled to the base plate 34 of the carriage assembly 32. The coupling portion 40 is in fluid communication with the base unit 16. The transfer portion 42 is coupled to the coupling portion 40 whereby the transfer portion 42 permits fluid received by the coupling portion 40 to be transferred to the mobile unit 14. The transfer portion 42 is in fluid communication with the nozzle assembly 18 to provide fluid to the nozzle assembly 18.

A supply conduit 44 is coupled to the base unit 16 and the coupling portion 40 of the intake member 38 of the mobile unit 14. The supply conduit 44 is in fluid communication between the mobile unit 14 and the base unit 16. The supply conduit 44 is for permitting the fluid to be supplied to the mobile unit 14 from the base unit 16. The supply conduit 44 is selectively extended and withdrawn by the base unit 16 to advance the mobile unit 14 along the track member 12.

The track member 12 comprises a channel 46 extending along a length of the track member 12. The supply conduit 44 is positioned in the channel 46 of the track member 12 to facilitate maintaining alignment of the supply conduit 44 with the track member 12 when the supply conduit 44 is being moved along the track member 12 to advance the mobile unit 14 along the track member 12. At least one of the rollers 36 of the carriage assembly 32 are selectively positioned in the channel 46 of the track member 12 to facilitate maintaining alignment of the carriage assembly 32 with the track member 12.

A pulley 48 is rotatably coupled to the track member 12 whereby the pulley 48 engages the supply conduit 44 between the base unit 16 and the track member 12. The pulley 48 rotates with respect to the track member 12 to facilitate transition of the supply conduit 44 into and out of the channel 46 of the track member 12 when the supply conduit 44 is moving along the track member 12.

The base unit 16 comprises a reel member 50 and a chassis member 52 whereby the reel member 50 is rotatably coupled to the chassis member 52. The reel member 50 is coupled to the supply conduit 44 whereby the supply conduit 44 is selectively wound onto and wound off of the reel member 50 when the reel member 50 is rotated with respect to the chassis member 52.

The base unit 16 comprises an alignment arm 54 being coupled to the chassis member 52. The alignment arm 54 extends upwardly from the chassis member 52. The alignment arm 54 engages the supply conduit 44 to maintain alignment of the supply conduit 44 with the pulley 48 and the channel 46 of the track member 12 to inhibit the supply conduit 44 being inadvertently directed out of the channel 46 of the track member 12 when the supply conduit 44 is being wound onto or off of the reel member 50. The base unit 16 has a guide loop 56 being coupled to the alignment arm 54 opposite the chassis member 52. The supply conduit 44 passes between the guide loop 56 and the alignment arm 54 to maintain alignment of the supply conduit 44 with the pulley 48 and the channel 46 of the track member 12 when the supply conduit 44 is being wound onto or off of the reel member 50.

The base unit 16 comprises a base motor 58 being coupled to the chassis member 52. The base motor 58 is operationally coupled to the reel member 50 whereby the base motor 58 rotates the reel member 50 with respect to the chassis member 52 when the base motor 58 is actuated.

The base unit 16 comprises a base control means 60 for controlling the base control motor. The base control means 60 is operationally coupled to the base motor 58. The base control means 60 actuating the base motor 58 to control the direction and speed of rotation of the reel member 50 by the base motor 58 when the base control means 60 is actuated by a user.

The chassis member 52 comprises a main portion 62 and a handle portion 64. The reel member 50 and the base motor 58 are coupled to the main portion 62 of the chassis member 52. The handle portion 64 extends outwardly from the main portion 62 and is for being engaged by the user to transport the main portion 62 to a desired location. The handle portion 64 can support the base control means 60 when the base control means 60 is not in use by the user.

The base unit 16 comprises a plurality of wheels 66 being operationally coupled to the main portion 62 of the chassis member 52. The wheels 66 are for engaging the floor of the livestock confinement building to facilitate transporting of the base unit 16 around the livestock confinement building.

The base unit 16 comprises at least one rechargeable battery 68 being positioned on the main portion 62 of the chassis member 52. The rechargeable battery 68 is operationally coupled to the base control means 60 and the base motor 58 to supply power to the base motor 58 when the base motor 58 is rotating the reel member 50. The rechargeable batter is selectively coupled to the power source to recharge the rechargeable battery 68.

Figure 5:
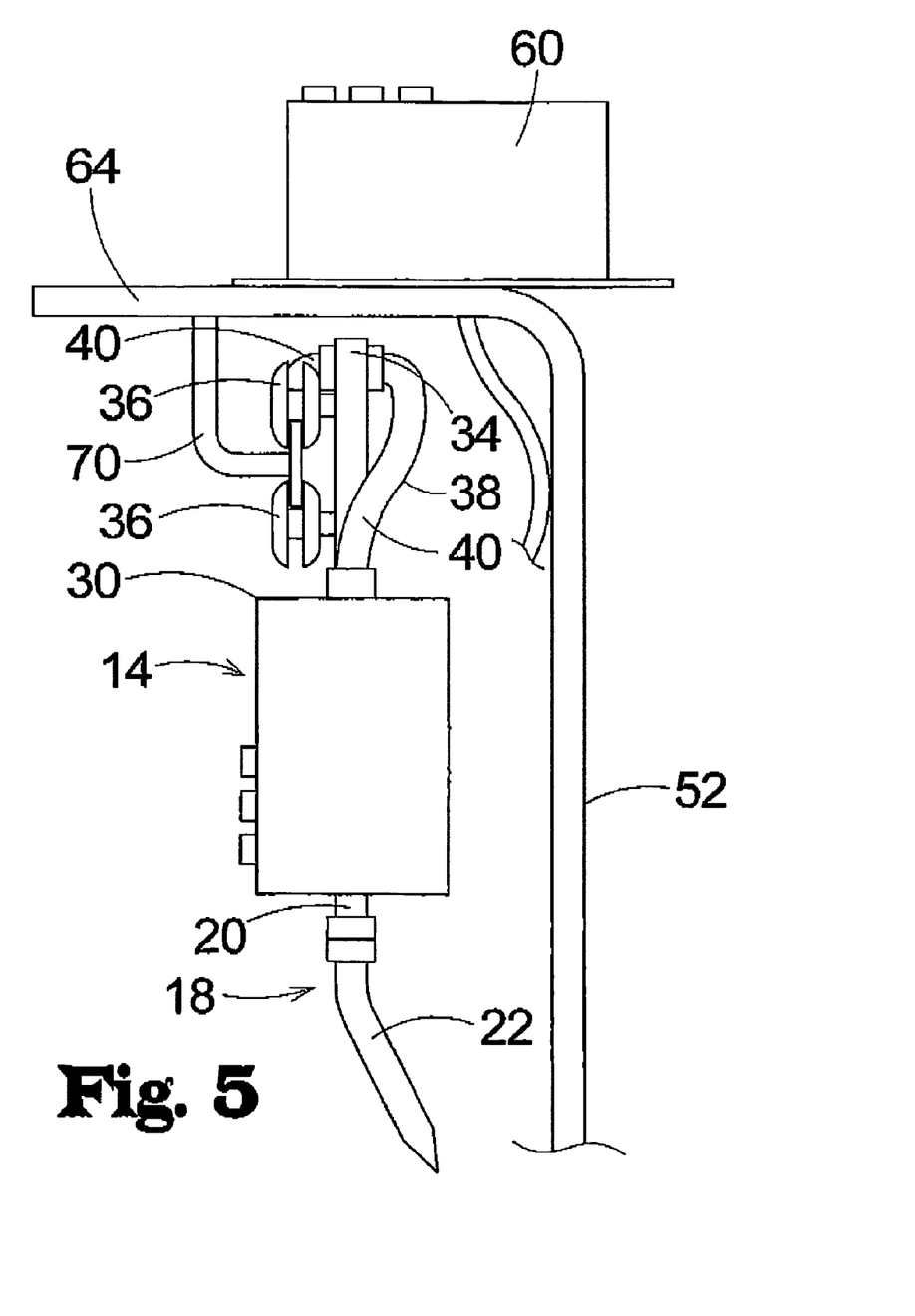
FIG. 5 is a side view of the mobile unit of the present invention stored on the storage member of the base unit.

The base unit 16 comprises a storage member 70 extending downwardly from the handle portion 64 of the chassis member 52. The storage member 70 engages the carriage assembly 32 to allow the mobile unit 14 to be stored below the handle portion 64 of the chassis member 52 when the mobile unit 14 is not being used to clean the livestock, confinement building.

A supply means 72 for supplying pressurized fluid to the mobile unit 14. The supply means 72 is coupled to the base unit 16 whereby the supply means 72 is in fluid communication with the supply conduit 44. The supply means 72 is for being coupled to the fluid source whereby the supply means 72 is for controlling the flow of the fluid from the fluid source through the supply conduit 44 to the mobile unit 14 when the supply means 72 is actuated by a user.

The supply means 72 may comprise a valve assembly 74 with a valve 76, an inlet portion 78 and an outlet portion 79, as shown in FIGS. 1 through 5. The inlet portion 78 is coupled to the fluid source, which is pressurized, and directs the fluid to the valve 76. The valve 76 is actuated by the user to control the flow of fluid from the fluid source to the supply conduit 44 coupled to the outlet portion 79 of the supply means 72. Additionally, the supply means 72 may comprise a pump assembly, not shown, for being in fluid communication with a non pressurized fluid supply where the pump assembly draws the fluid from the fluid supply and pressurizes the fluid before the fluid is supplied to the mobile unit 14 through the supply conduit 44 in fluid communication with the pump assembly.

In use, the user couples the track member 12 to the ceiling of the livestock confinement building and arranges the track member 12 in a pattern that most efficiently positions the mobile unit 14 over the pens of the livestock confinement building to clean the pens. The carriage assembly 32 is engaged to the track member 12 so that the mobile unit 14 extends downwardly from the track member 12. The base unit 16 is the positioned at the end of the track member 12 with the pulley 48 coupled to the track member 12. The supply conduit 44 is then extended from the reel member 50 and passed between the alignment arm 54 and the guide loop 56 and the fed over the pulley 48 and into the channel 46 of the track member 12. The end of the supply conduit 44 is then coupled to the coupling portion 40 of the intake member 38 to permit fluid communication between the supply conduit 44 and the mobile unit 14. The supply means 72 of the base unit 16 is then coupled to the fluid supply to provide the supply conduit 44 with the fluid for the mobile unit 14. The mobile control means 28 is then actuated by the user to rotate the nozzle assembly 18 in the desired direction at the desired speed. The supply means 72 is then actuated to allow the fluid to be supplied to the mobile unit 14 and to the nozzle assembly 18 so that the fluid can be sprayed into the pens to clean the pens. The base control means 60 is then actuated to allow the base motor 58 to rotate the reel member 50 and either wind the supply conduit 44 back onto the reel member 50 and draw the mobile unit 14 from the end of the track member 12 to the end of the track member 12 with the pulley 48 to clean the pens as the mobile is drawn along the track member 12. Alternatively, the base control means 60 maybe actuated to actuate the base motor 58 to dispense the supply conduit 44 from the reel member 50 and the semi-rigid supply conduit 44 will push the mobile unit 14 along the track member 12 from the end of the track member 12 with the pulley 48 to the opposite end of the track member 12 when the supply conduit 44 is being fed into the channel 46 of the track member 12.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. An enclosure washing system for cleaning portions of an interior space of a livestock confinement building having a floor, a ceiling above the floor and a plurality of dividers dividing the interior space into a plurality of pens, the enclosure washing system comprising:
   a track member for being coupled to the ceiling of the livestock confinement building;
   a mobile unit operationally engaging said track member such that said mobile unit selectively advances along said track member, said mobile unit for being in fluid communication with a fluid source to spray fluid into the interior space of the livestock confinement building to clean the interior space of the livestock confinement building when said mobile unit advances along said track member;
   a base unit for being positioned on the floor of the livestock confinement building, said base unit being in fluid communication with said mobile unit such that said base unit is for controlling the flow of the fluid from the fluid source to provide said mobile unit with pressurized fluid when said mobile unit is cleaning the interior space of the livestock confinement building; and
   a nozzle assembly being operationally coupled to said mobile unit such that said nozzle assembly is in fluid communication with said mobile unit, said nozzle assembly being for spraying the fluid from said mobile unit into the interior space of the livestock confinement building, said mobile unit rotating said nozzle assembly with respect to said mobile unit to direct the fluid around the interior space of the livestock confinement building.

2. The enclosure washing system as set forth in claim 1, wherein said nozzle assembly comprises an inlet member and a nozzle member, said inlet member being operationally coupled to said mobile unit such that said inlet member is rotated by said mobile unit, said nozzle member being coupled to said inlet member such that said nozzle member is positioned opposite said mobile unit, said inlet member being in fluid communication between said nozzle member and said mobile unit such that said nozzle member is for spraying the fluid from the mobile unit to clean the interior space of the livestock confinement building.

3. The enclosure washing system as set forth in claim 2, wherein said nozzle member is positioned at an oblique angle to said inlet member, said nozzle member being rotated around a vertical axis of said inlet member when said inlet member is rotated by said mobile unit to allow the fluid to be sprayed at an angle to the mobile unit to access openings in dividers between pens to clean the interior space of the livestock confinement building.

4. The enclosure washing system as set forth in claim 1, wherein said mobile unit comprises a drive motor, said drive motor being operationally coupled to said nozzle assembly to rotate said nozzle assembly with respect to said mobile unit.

5. The enclosure washing system as set forth in claim 4, wherein said mobile unit comprises a rechargeable power supply being operationally coupled to said drive motor, said rechargeable power supply supplying power to said drive motor when said drive motor is rotating said nozzle assembly, said power supply being for selectively engaging a power source to recharge said rechargeable power supply when said mobile unit is not being used to clean the interior space of the livestock confinement building.

6. The enclosure washing system as set forth in claim 1, further comprising;
   a carriage assembly being coupled to said mobile unit, said carriage assembly operationally engaging said track member such that said carriage assembly advances along said track member to facilitate advancing said mobile unit along said track member.

7. The enclosure washing system as set forth in claim 6, wherein said carriage assembly comprises a base plate and a plurality of rollers, each of said rollers being rotatably coupled to said base plate, said base plate being coupled to said mobile unit, each said rollers engaging said track member such that each of said rollers rolls along said track member to advance said mobile unit along said track member when said carriage assembly is advancing along said track member.

8. The enclosure washing system as set forth in claim 7, wherein said rollers of said carriage assembly comprises at least one of said rollers being positioned above said track member and at least one of said rollers being positioned below said track member to inhibit said carriage assembly becoming inadvertently disengaged from said track member when said carriage assembly is advancing along said track member.

9. The enclosure washing system as set forth in claim 6, wherein said mobile unit comprises an intake member being coupled to said carriage assembly to limit the amount of stress on said intake member when said mobile unit is advanced along said track member, said intake member being in fluid communication with said base unit to supply the fluid to said mobile unit when said mobile unit is cleaning the interior space of the livestock confinement building.

10. The enclosure washing system as set forth in claim 9, further comprising:
    said intake member comprising a coupling portion and a transfer portion, said coupling portion being coupled to said carriage assembly, said coupling portion being in fluid communication with said base unit, said transfer portion being coupled to said coupling portion such that said transfer portion permits fluid received by said coupling portion to be transferred to said mobile unit.

11. The enclosure washing system as set forth in claim 1, further comprising:
    a supply conduit being coupled to said base unit and said mobile unit, said supply conduit being in fluid communication between said mobile unit and said base unit, said supply conduit being for permitting the fluid to be supplied to said mobile unit from said base unit, said supply conduit being selectively extended and withdrawn by said base unit to advance said mobile unit along said track member.

12. The enclosure washing system as set forth in claim 11, wherein said track member comprises a channel extending along a length of said track member, said supply conduit being positioned in said channel of said track member to facilitate maintaining alignment of said supply conduit with said track member when said supply conduit is being moved along said track member to advance said mobile unit along said track member.

13. The enclosure washing system as set forth in claim 12, further comprising:
a pulley being rotatably coupled to said track member such that said pulley engages said supply conduit between said base unit and said track member, said pulley rotating with respect to said track member to facilitate transition of said supply conduit into and out of said channel of said track member when said supply conduit is moving along said track member.

14. The enclosure washing system as set forth in claim 11, wherein said base unit comprises a reel member and a chassis member such that said reel member is rotatably coupled to said chassis member, said reel member being coupled to said supply conduit such that said supply conduit is selectively wound onto and wound off of said reel member when said reel member is rotated with respect to said chassis member.

15. The enclosure washing system as set forth in claim 14, wherein said base unit comprises a base motor being coupled to said chassis member, said base motor being operationally coupled to said reel member such that said base motor rotates said reel member with respect to said chassis member when said base motor is actuated.

16. The enclosure washing system as set forth in claim 11, further comprising:
a supply means for supplying pressurized fluid to said mobile unit, said supply means being coupled to said base unit such that said supply means is in fluid communication with said supply conduit, said supply means for being coupled to the fluid source such that said supply means is for controlling the flow of the fluid from the fluid source through the supply conduit to said mobile unit when said supply means is actuated by a user.

17. An enclosure washing system for cleaning portions of an interior space of a building having a floor, a ceiling above the floor and a plurality of dividers dividing the interior space into a plurality of pens, the enclosure washing system comprising:
a track member for coupling to the ceiling of the building;
a mobile unit suspendable from said track member for advancing along said track member;
a base unit for positioning on the floor of the building, said base unit being in fluid communication with said mobile unit and being configured to provide said mobile unit with pressurized fluid when said mobile unit is cleaning the interior space of the building; and
wherein said mobile unit includes a nozzle assembly mounted on said mobile unit for spraying fluid from said mobile unit into the interior space of the building, said nozzle assembly being rotatable with respect to said mobile unit.

18. The enclosure washing system as set forth in claim 17, wherein said nozzle assembly is rotatable about a substantially vertical axis when said mobile unit is suspended from said track member.

19. The enclosure washing system of claim 17 wherein said nozzle assembly includes a first portion and second portion, said second portion including a nozzle, said second portion being positioned at an oblique angle to said first position such that when said mobile unit is suspended from said track member, said first portion is oriented along a substantially vertical axis and said second portion is oriented at the oblique angle to the substantially vertical axis.

20. The enclosure washing system of claim 17 additionally comprising a carriage assembly coupled to said mobile unit for mounting said mobile unit on said track member, said carriage assembly being positioned on said mobile unit in a substantially opposite location from said nozzle assembly such that said nozzle assembly is positioned at a lower position on said mobile unit when said carriage assembly is mounted on said tack member.

* * * * *